United States Patent [19]

Okumura et al.

[11] Patent Number: 5,226,095
[45] Date of Patent: Jul. 6, 1993

[54] METHOD OF DETECTING THE POSITION OF AN OBJECT PATTERN IN AN IMAGE

[75] Inventors: Kazumasa Okumura, Uji; Seiji Mizuoka, Katano, both of Japan

[73] Assignee: Matsushita Electric Industrial Co., Ltd., Osaka, Japan

[21] Appl. No.: 890,323

[22] Filed: May 26, 1992

Related U.S. Application Data

[63] Continuation of Ser. No. 431,511, Nov. 3, 1989, abandoned.

[30] Foreign Application Priority Data

Nov. 4, 1988 [JP] Japan .................. 63-278691

[51] Int. Cl.$^5$ ............................................. G06K 9/36
[52] U.S. Cl. ................................... 382/48; 382/27
[58] Field of Search ............ 382/48, 22, 27, 30, 382/34, 8

[56] References Cited

U.S. PATENT DOCUMENTS

| | | | |
|---|---|---|---|
| 3,898,617 | 8/1975 | Kashioka et al. | 382/48 |
| 4,334,241 | 6/1982 | Kashioka et al. | 382/48 |
| 4,543,660 | 9/1985 | Maeda | 382/34 |
| 4,581,762 | 4/1986 | Lapidus et al. | 382/22 |

OTHER PUBLICATIONS

Tzay Young "Handbook of Pattern Recognition and Image Processing" 1986, pp. 192-193, 219-220.

*Primary Examiner*—David K. Moore
*Assistant Examiner*—David Fox
*Attorney, Agent, or Firm*—Panitch Schwarze Jacobs & Nadel

[57] ABSTRACT

A method in which the position of an object pattern in an image can be accurately detected is disclosed. The method comprises the steps of: (a) preparing a reference pattern which has a pattern and a background which are composed of pixels each having a value regarding the brightness or gradation; (b) dividing the image into a plurality of sections; (c) selecting arbitrarily an area having two or more of the sections; (d) obtaining the brightness data from each of the sections; (e) obtaining a sum of products of the value of each pixel and the brightness data of each section corresponding to the pixel; (f) moving the area to another position in the image; (g) repeating steps (d) to (f); and (h) deciding that the area from which the sum having an extreme value is obtained is the one containing the object pattern.

3 Claims, 5 Drawing Sheets

Fig. 1A
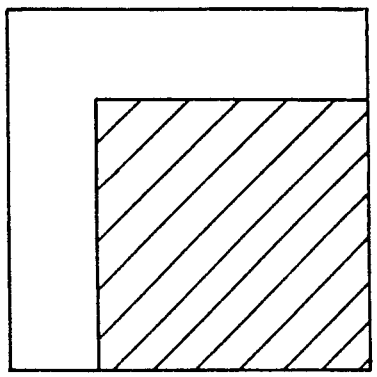
Fig. 1B
| -1 | -1 | -1 | -1 | -1 | -1 | -1 | -1 |
|----|----|----|----|----|----|----|----|
| -1 | -1 | -1 | -1 | -1 | -1 | -1 | -1 |
| -1 | -1 | 1  | 1  | 1  | 1  | 1  | 1  |
| -1 | -1 | 1  | 1  | 1  | 1  | 1  | 1  |
| -1 | -1 | 1  | 1  | 1  | 1  | 1  | 1  |
| -1 | -1 | 1  | 1  | 1  | 1  | 0  | 0  |
| -1 | -1 | 1  | 1  | 1  | 0  | 0  | 0  |
| -1 | -1 | 1  | 1  | 1  | 0  | 0  | 0  |
Fig. 1C
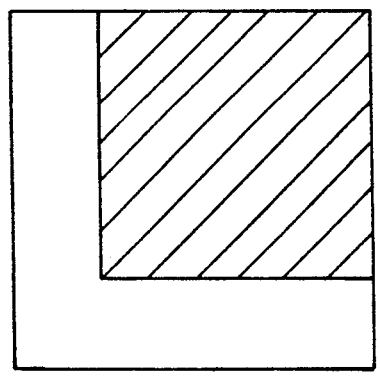
Fig. 1D
| -1 | -1 | 1  | 1  | 1  | 0  | 0  | 0  |
|----|----|----|----|----|----|----|----|
| -1 | -1 | 1  | 1  | 1  | 0  | 0  | 0  |
| -1 | -1 | 1  | 1  | 1  | 1  | 0  | 0  |
| -1 | -1 | 1  | 1  | 1  | 1  | 1  | 1  |
| -1 | -1 | 1  | 1  | 1  | 1  | 1  | 1  |
| -1 | -1 | 1  | 1  | 1  | 1  | 1  | 1  |
| -1 | -1 | -1 | -1 | -1 | -1 | -1 | -1 |
| -1 | -1 | -1 | -1 | -1 | -1 | -1 | -1 |
Fig. 1E
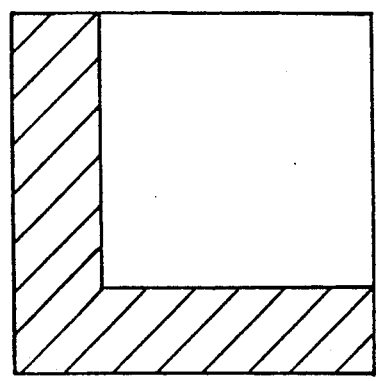
Fig. 1F
| 1 | 1 | -1 | -1 | -1 | 0  | 0  | 0  |
|---|---|----|----|----|----|----|----|
| 1 | 1 | -1 | -1 | -1 | 0  | 0  | 0  |
| 1 | 1 | -1 | -1 | -1 | -1 | 0  | 0  |
| 1 | 1 | -1 | -1 | -1 | -1 | -1 | -1 |
| 1 | 1 | -1 | -1 | -1 | -1 | -1 | -1 |
| 1 | 1 | -1 | -1 | -1 | -1 | -1 | -1 |
| 1 | 1 | 1  | 1  | 1  | 1  | 1  | 1  |
| 1 | 1 | 1  | 1  | 1  | 1  | 1  | 1  |

Fig. 2A

|   | 0 | 1 | 2 | 3 | 4 | 5 | 6 | 7 |
|---|---|---|---|---|---|---|---|---|
| 0 | -1 | -1 | -1 | -1 | -1 | -1 | -1 | -1 |
| 1 | -1 | -1 | -1 | -1 | -1 | -1 | -1 | -1 |
| 2 | -1 | -1 | 1 | 1 | 1 | 1 | 1 | 1 |
| 3 | -1 | -1 | 1 | 1 | 1 | 1 | 1 | 1 |
| 4 | -1 | -1 | 1 | 1 | 1 | 1 | 1 | 1 |
| 5 | -1 | -1 | 1 | 1 | 1 | 1 | 0 | 0 |
| 6 | -1 | -1 | 1 | 1 | 1 | 0 | 0 | 0 |
| 7 | -1 | -1 | 1 | 1 | 1 | 0 | 0 | 0 |

| 21 | 22 | 23 | 22 | 22 | 22 | 21 | 22 | 22 | 22 | 23 | 22 | 22 | 22 | 21 | 22 | 22 | 22 | 21 | 22 |
|----|----|----|----|----|----|----|----|----|----|----|----|----|----|----|----|----|----|----|----|
| 22 | 22 | 22 | 23 | 22 | 22 | 22 | 21 | 22 | 22 | 23 | 23 | 24 | 22 | 22 | 22 | 21 | 22 | 23 | 22 |
| 22 | 22 | 23 | 22 | 22 | 22 | 22 | 22 | 22 | 22 | 22 | 22 | 23 | 22 | 21 | 22 | 22 | 22 | 22 | 22 |
| 22 | 22 | 23 | 22 | 22 | 21 | 22 | 21 | 22 | 22 | 22 | 22 | 22 | 22 | 22 | 22 | 22 | 21 | 22 | 22 |
| 22 | 22 | 22 | 22 | 22 | 21 | 21 | 21 | 22 | 22 | 22 | 22 | 22 | 22 | 22 | 21 | 22 | 21 | 21 | 21 |
| 22 | 22 | 22 | 22 | 22 | 22 | 21 | 22 | 22 | 23 | 22 | 23 | 22 | 22 | 22 | 21 | 21 | 21 | 22 | 22 |
| 22 | 23 | 22 | 22 | 22 | 22 | 22 | 22 | 22 | 22 | 22 | 23 | 22 | 22 | 22 | 21 | 22 | 22 | 22 | 22 |
| 22 | 23 | 22 | 22 | 22 | 22 | 22 | 22 | 22 | 22 | 22 | 24 | 23 | 22 | 22 | 23 | 22 | 22 | 23 | 24 |
| 22 | 22 | 22 | 22 | 22 | 22 | 21 | 22 | 22 | 22 | 23 | 24 | 26 | 25 | 24 | 25 | 23 | 24 | 24 | 25 |
| 24 | 24 | 23 | 21 | 24 | 25 | 26 | 22 | 22 | 22 | 24 | 28 | 29 | 30 | 28 | 26 | 29 | 30 | 28 | 27 |
| 25 | 26 | 27 | 26 | 29 | 28 | 22 | 23 | 23 | 22 | 24 | 30 | 43 | 44 | 46 | 43 | 46 | 47 | 45 | 46 |
| 45 | 46 | 45 | 44 | 47 | 27 | 22 | 22 | 22 | 22 | 23 | 29 | 45 | 47 | 46 | 45 | 46 | 46 | 47 | 47 |
| 44 | 45 | 46 | 49 | 48 | 26 | 21 | 22 | 23 | 23 | 24 | 27 | 44 | 44 | 45 | 46 | 46 | 45 | 48 | 49 |
| 45 | 46 | 46 | 49 | 43 | 27 | 22 | 22 | 22 | 23 | 25 | 30 | 46 | 46 | 46 | 45 | 47 | 44 | 48 | 48 |
| 46 | 45 | 49 | 47 | 48 | 28 | 23 | 22 | 22 | 23 | 25 | 29 | 45 | 46 | 46 | 46 | 48 | 48 | 47 | 48 |
| 45 | 46 | 46 | 47 | 47 | 29 | 23 | 23 | 22 | 22 | 24 | 28 | 46 | 47 | 47 | 46 | 49 | 48 | 47 | 49 |
| 45 | 45 | 47 | 46 | 47 | 30 | 23 | 22 | 22 | 22 | 24 | 27 | 45 | 45 | 46 | 49 | 50 | 49 | 47 | 49 |
| 46 | 46 | 46 | 46 | 47 | 28 | 24 | 23 | 22 | 23 | 23 | 26 | 27 | 28 | 30 | 47 | 50 | 50 | 48 | 49 |
| 46 | 46 | 45 | 46 | 46 | 27 | 23 | 22 | 22 | 22 | 24 | 26 | 27 | 29 | 31 | 48 | 51 | 51 | 49 | 50 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 1 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |

| 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 0 | 0 | 1 | 1 | 1 | 1 | 1 | 1 |
| 1 | 1 | 1 | 1 | 1 | 0 | 0 | 0 | 0 | 0 | 0 | 0 | 0 | 1 | 1 | 1 | 1 | 1 | 1 |

—52, —C

METHOD OF DETECTING THE POSITION OF AN OBJECT PATTERN IN AN IMAGE

This is a continuation of Ser. No. 431,511 filed Nov. 3, 1989, now abandoned.

BACKGROUND OF THE INVENTION

1. Field of the Invention

The present invention relates to a method of detecting the position of an object pattern in an image, and more particularly, to a method of position recognition which may be suitably applied for recognizing an object pattern having good shape reproducibility such as a pattern on the surface of an integrated circuit.

2. Description of the Prior Art

Conventionally, a position of a surface pattern of an integrated circuit is detected by a so-called template matching method in which a reference pattern having the shape to be detected has been previously registered as a template, an image is picked up by a television camera, the pattern of each section of the picked-up image is binary-coded, and then the binary-coded data of the pattern are sequentially compared with the template for detecting the position where the best matching between the two is obtained.

This method will be described in more detail with reference to FIGS. 5A and 5B. FIG. 5A shows a binary-coded template 51 in which the pattern to be detected is binary-coded by denoting a white pixel by the digit "1" and denoting a black pixel by the digit "0". A binary-coded image 52 to be inspected is shown in FIG. 5B. In practice, the template 51 is produced only in a computer, and not actually formed in a physical body as shown in FIG. 5A, and thus the processes described below are conducted in the computer. The template 51 is superimposed over an area in the top left-hand corner of the object image 52, and the matching status between the facing pixels is examined. If "0" is superimposed on "0" or "1" on "1", it is determined that the pixels match each other. Next, the template 51 is moved by one pixel to the right for performing the examination in the same manner. Such examination is repeated until the template 51 is moved to the bottom right-hand corner of the image 52. Thereafter, the area having the highest matching rate is determined as the recognition point. In the case of the image 52, the area indicated by C has the highest matching rate (i.e., 64), and, therefore, the area C is detected as the recognition point. In other words, the area C has the object pattern.

However, the above method has a drawback in that, if the lightness of a body changes, the binary-coded image of the body also changes, leading to a recognition error or a total failure of recognition. For example, when the body from which the binary-coded image of FIG. 5B is obtained under a bright condition is processed under a dark condition to obtain a binary-coded image thereof, all pixels of the obtained binary-coded image turn into the state of "0", leaving no pixels in the state of "1". Therefore, the matching rate will become the same at any position, resulting in that the position of the object pattern cannot be determined. The above-mentioned drawback is caused also by changing the reflectivity of the body to be inspected or by changing the illuminance on the body.

SUMMARY OF THE INVENTION

The method of detecting the position of an object pattern in an image of this invention, which overcomes the above-discussed and numerous other disadvantages and deficiencies of the prior art, comprises the steps of: (a) preparing a reference pattern which has a pattern and a background which are composed of one or more pixels each having a value regarding the brightness or gradation, the shape of said pattern corresponding to said object pattern, the value of each pixel of said pattern being different from that of each pixel of said background; (b) dividing said image into a plurality of sections; (c) selecting arbitrarily an area having two or more of said sections, the shape of said area corresponding to that of said reference pattern; (d) obtaining the brightness data from each of said sections; (e) obtaining a sum of products of the value of each pixel and the brightness data of each section corresponding to the pixel; (f) moving said area to another position in said image; (g) repeating steps (d) to (f); and (h) deciding that the area from which the sum having an extreme value is obtained is the one containing said object pattern.

In a preferred embodiment, the extreme value is the largest value among said obtained sums.

In a preferred embodiment, the extreme value is the smallest value among said obtained sums.

In a preferred embodiment, the values of said pixels consist of 1, 0 and −1, and the total of said values is zero.

The method of detecting the position of an object pattern in an image of this invention, comprises the steps of: (a) preparing two or more reference patterns which have a pattern and a background, said pattern and background being composed of one or more pixels each having a value regarding the brightness or gradation, the shape obtained from said patterns when said reference patterns are arranged in a predetermined geometrical or positional relationship corresponding to said object pattern, the value of each pixel of said pattern being different from that of each pixel of said background, a portion of each of said reference patterns being designated as a specific portion; (b) storing said positional relationship; (c) dividing said image into a plurality of sections; (d) selecting arbitrarily an area having two or more of said sections, the shape of said area corresponding to that of said reference pattern; (e) obtaining brightness data from each of said sections; (f) obtaining a sum of products of the value of each pixel of both said reference pattern and other reference patterns and the brightness data of each section corresponding to the pixel; (g) moving said area to another position in said image; (h) repeating steps (e) to (g); (i) selecting two or more portions from which the sum having an extreme value or a value adjacent to said extreme value is obtained, for both said reference pattern and other reference patterns; (j) obtaining the position in each of said selected portions which corresponds to said specific part or said other specific part; (k) obtaining the positional relationships in each pair of said obtained positions; (l) obtaining the pair having the positional relationship which is closest to said stored positional relationship; and (m) deciding that the area which corresponds to said obtained pair is the one containing said object pattern.

In a preferred embodiment, the extreme value is the largest value among said obtained sums.

In a preferred embodiment, the extreme value is the smallest value among said obtained sums.

In a preferred embodiment, the values of said pixels consist of 1, 0 and −1, and the total of said values is zero.

Thus, the invention described herein makes possible the objectives of:

(1) providing a method of detecting the position of an object pattern in an image in which the position can be accurately and stably detected even when the image has been obtained under a dark condition;

(2) providing a method of detecting the position of an object pattern in an image in which the position can be accurately and stably detected even when the image has been obtained from a body the reflectivity of which changes; and (3) providing a method of detecting the position of an object pattern in an image in which the position can be accurately and stably detected even when the image has been obtained under a changing illumination.

BRIEF DESCRIPTION OF THE DRAWINGS

This invention may be better understood and its numerous objects and advantages will become apparent to those skilled in the art by reference to the accompanying drawings as follows:

FIGS. 1a-1f illustrate examples object patterns and reference patterns.

FIG. 2A illustrates a reference pattern used in an embodiment of the invention.

FIG. 2B illustrates an image coded by brightness data from which the position of the object pattern is detected using the reference pattern of FIG. 2A.

FIG. 5A illustrates a template used in a prior art method.

FIG. 5B illustrates a binary-coded image used in a prior art method.

DESCRIPTION OF THE PREFERRED EMBODIMENTS

Figure 3:
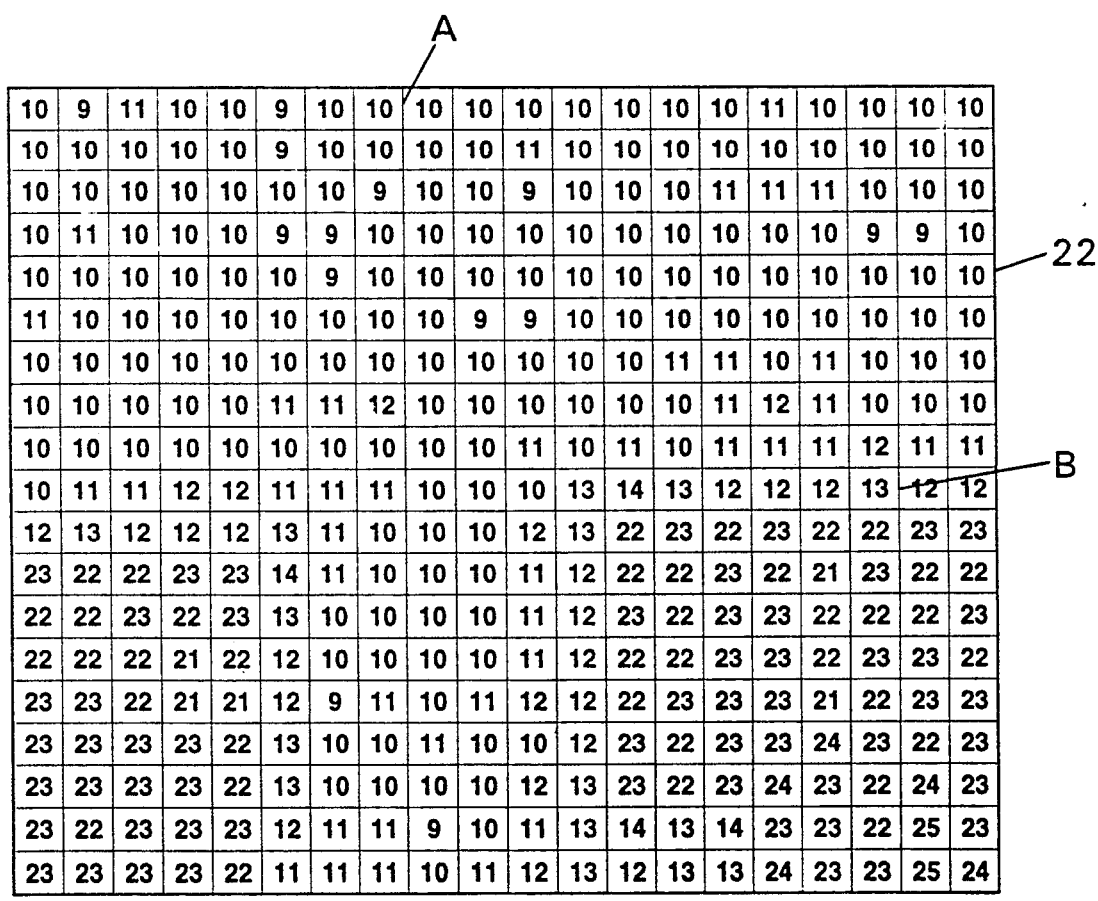
FIG. 3 illustrates an image which is obtained when the image of FIG. 2B darkens.

FIG. 1 illustrates examples of a reference pattern useful in an embodiment of the invention. In FIG. 1, (a), (c) and (e) show object patterns 1a, 1c and 1e, and (b), (d) and (f) reference patterns 1b, 1d and 1f which correspond to the object patterns 1a, 1c and 1e, respectively. In the object patterns 1a, 1c and 1e, the hatched portions indicate high-brightness and whitish areas. The reference patterns 1b, 1d and 1f are divided into 64(=8×8) sections or pixels. Each pixel is allocated with a brightness factor (1, 0 or −1) so that the reference patterns 1a, 1c and 1f represent respectively the object patterns 1a, 1c and 1e. In the embodiment, brightness factors are set so as to emphasize the contrast with the digit "1" designating a high-brightness portion and the digit "−1" a low-brightness portion. Pixels being at a position other than where the high-brightness portion border the low-brightness portion are allocated with the digit "0" so that the number of 1s equals the number of −1s as a result of normalization.

FIG. 2B illustrates an image to be inspected in the embodiment of the invention. The image 22 of FIG. 2B is divided into 380(=20×19) sections (hereinafter, referred to as "pixels"). Each of the pixels is allocated with a brightness value or brightness data. In the image 22, the brightness data ranges from 21 to 51. A pixel having a higher brightness is allocated with a larger number, and a pixel having a lower brightness with a smaller number. If the image 22 is reformed in a binary-coded image under the conditions that, for example, the value of 40 is set as the threshold, pixels having a value greater than 40 are designated by "1", and pixels having a value smaller than 40 are designated by "0", the resulting image will become identical with the image 52 shown in FIG. 5B.

The procedures of detecting the position of the reference pattern shown in FIG. 2A (which is identical with the pattern 1b shown in (b) of FIG. 1) in the image 22 of FIG. 2B will be described. First, the reference pattern 21 is superimposed over the image 22 as shown by A in FIG. 2B. Then, the calculations for obtaining the sum of products of the value of each pixel of the reference pattern 21 and the value of each section of the area A are performed. That is, when the brightness factor of each pixel positioning at the ith row and jth column is denoted by $M_{ij}$ (both i and j ranging from 0 to 7) and the brightness data of each pixel positioning at the ith row and jth column in the area A denoted by $S_{ij}$, the calculation of $\Sigma(M_{ij} \cdot S_{ij})$ is performed. The calculation thus performed produces the result of −4.

Next, the area is moved rightward by one pixel, and the calculations for obtaining the sum of products of the value of each pixel of the reference pattern 21 and the value of each section of the new area are performed in the same way as described above. The above procedure is repeated until the area comes to the bottom right-hand corner of the image, resulting in that the sum obtained from the area B shown in FIG. 2B is 1274 which is the greatest one. In the embodiment, the area from which the greatest sum is obtained is the recognition point, i.e., the area has the object pattern. Therefore, it is recognized that the area B has the object pattern. In an area where there is no variation in brightness, the obtained sum is zero, facilitating the recognition of the object pattern. This is caused by the fact that, when normalized, the total of the values of pixels in the reference pattern 21 is zero.

With reference to FIG. 3, the procedure in the case where the image to be inspected is dark will be described. In this case, the brightness data of each pixel of the image 22 becomes small and varies in a small range, as shown in FIG. 3. The calculations for obtaining the sum of products are conducted for each area in the same manner as described above, resulting in that the sum obtained from the area A is −4 and that from the area B is 302. The latter is the greatest one among the sums obtained from the image 22 shown in FIG. 3. In this way, even when the image is dark, it can be easily and reliably recognized that the area B has the object pattern.

When another pattern such as shown in (c) or (e) of FIG. 1 is to be detected, the procedure is conducted in the same manner as described above using another reference pattern such as shown in (b) or (d) of FIG. 1.

Figure 4A:
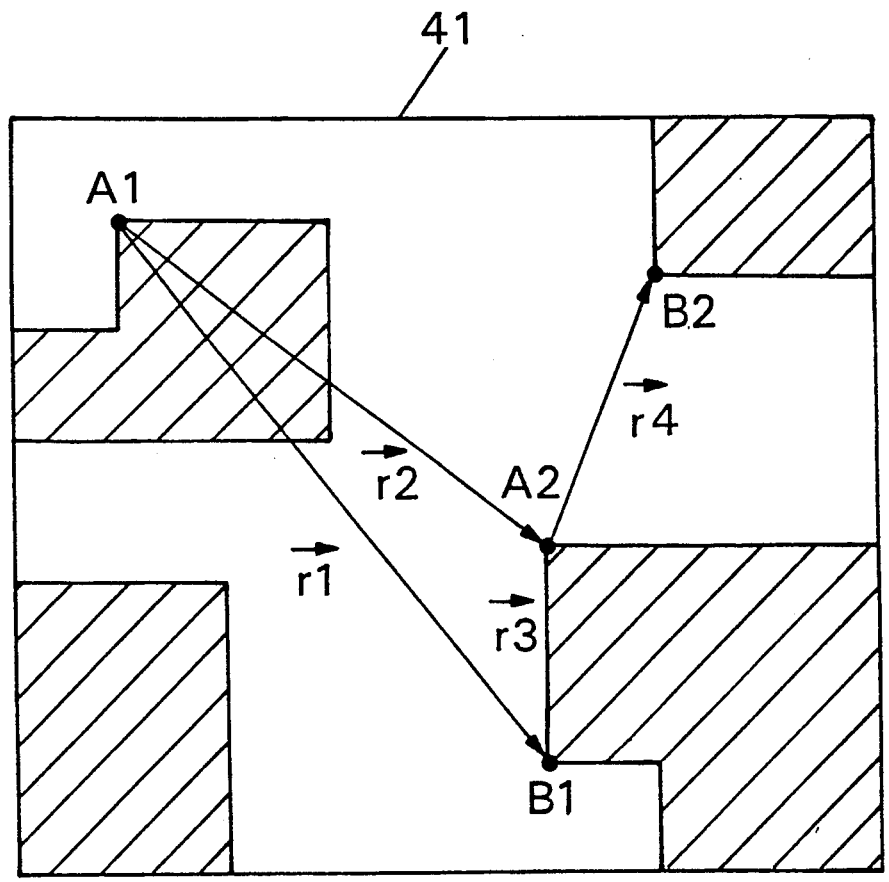
FIG. 4A is a diagram for illustrating another embodiment of the invention.
Figure 4B:
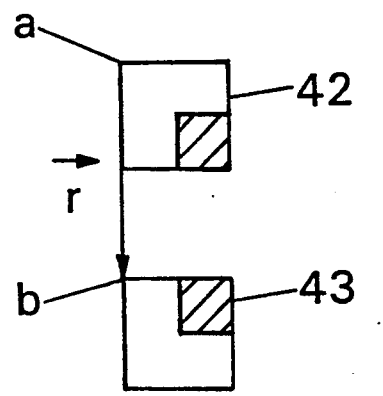
FIG. 4B is a diagram for illustrating the geometical or positional relationship of two reference patterns used in the other embodiment.
Figure 3:
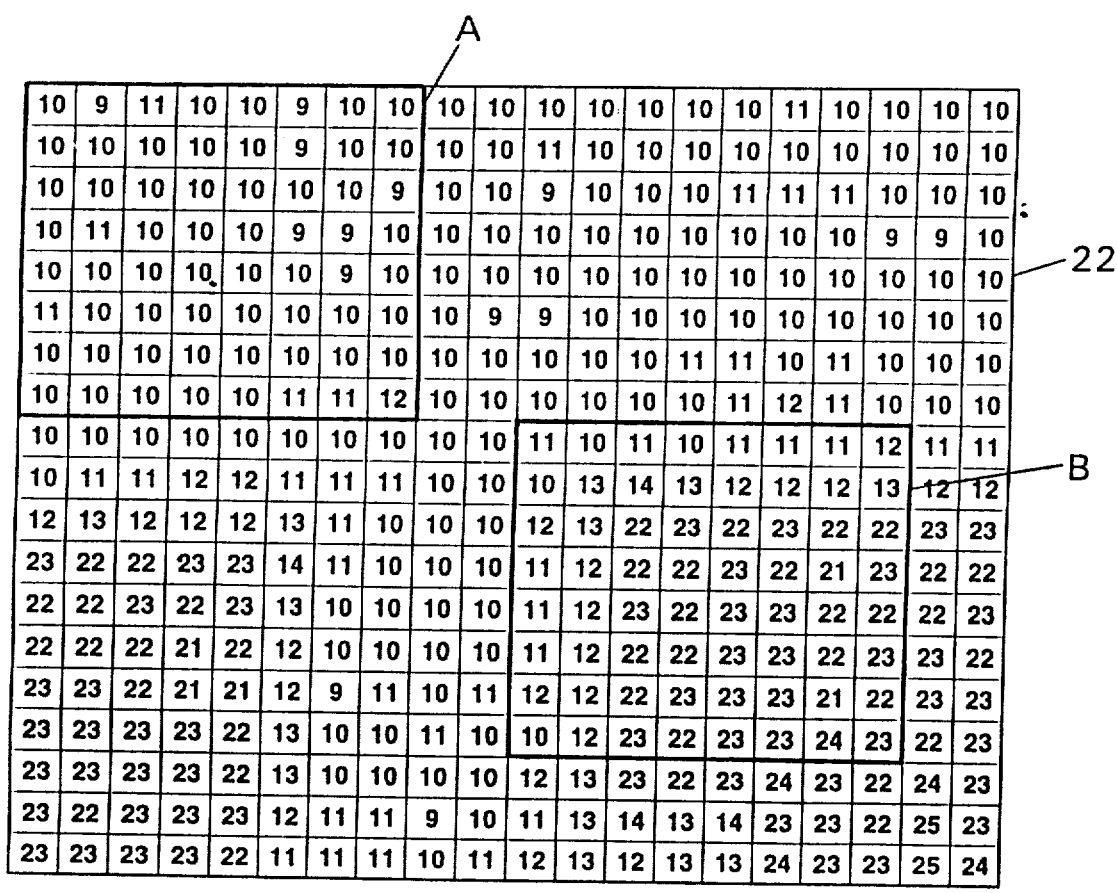
Figure 4A:
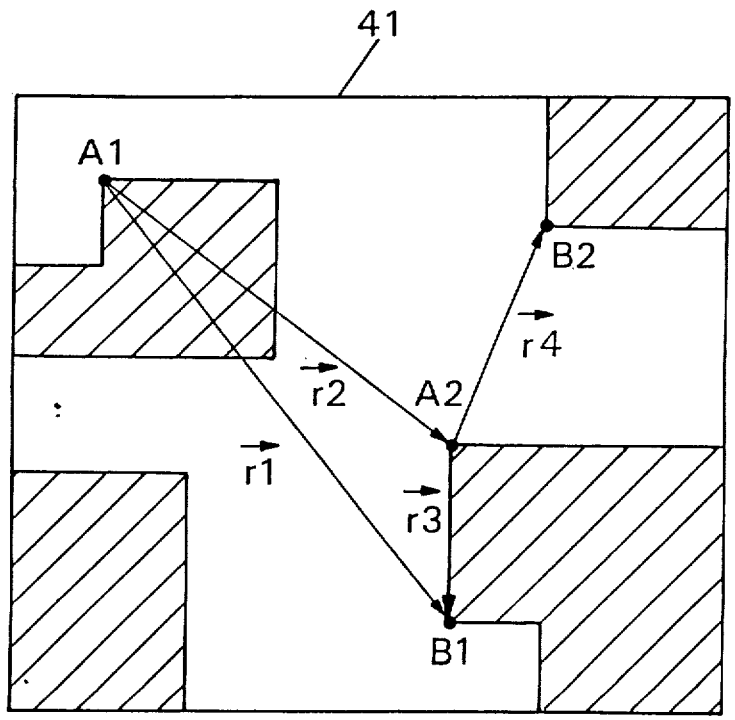
Figure 4B:
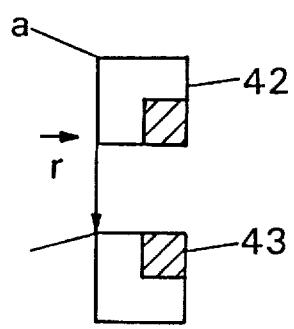

Further, the invention may be performed using two or more reference patterns. In this case, the detection can be easily and reliably performed even when the image has similar patterns as shown in FIG. 4A. An example of the procedure of detecting an object pattern from the image 41 shown in FIG. 4A in which procedure two reference patterns are used will be described referring to FIGS. 4A and 4B. Two reference patterns 42 and 43 are prepared, and their upper and left corners are designated as specific point a and b, respectively. A positional relationship $\vec{r}$ between the specific points a and b is established so that, when the two reference patterns 42 and 43 are arranged in accordance with the positional relationship $\vec{r}$, the combination of the two reference patterns 42 and 43 corresponds to the object pattern. The determined positional relationship is stored in a memory of a computer. Then, the calculations for obtaining the sum of products are performed in the similar manner as described above, for the reference pattern 42. Selected are two areas from which the greatest two values are obtained, or from which the values greater than those of eight adjacent areas and being the greatest. The positions corresponding to the point a in the selected two areas are indicated by A1 and A2 in FIG. 4A. Then, the above is repeated for the reference pattern 43, and the positions corresponding to the point b in the selected two areas are indicated by B1 and B2 in FIG. 4A. The positional relationships $\vec{r1}$ to $\vec{r4}$ between the points A1, A2, B1 and B2 are obtained, and compared with the previously stored positional relationship $\vec{r}$, resulting in that the positional relationship $\vec{r3}$ is the one closest to the previously stored positional relationship $\vec{r}$. The areas corresponding to the points A2 and B1 having the positional relationship $\vec{r3}$ is recognized as the areas having the object pattern. The positional relationship $\vec{r}$ may be designated by using either of an angle and a distance or by a combination of both.

In the above-described embodiments, the brightness factor of each pixel of the reference pattern is set so that the greatest sum of products is obtained at the area having the object pattern. Alternatively, the brightness factor may be set so that the smallest sum of products is obtained at the area having the object pattern.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of detecting the position of an object pattern in an image, comprising the steps of:

(a) preparing two or more reference patterns which have a foreground pattern and a background, said foreground pattern and background being composed of one or more pixels each having a value of 1, 0 or $-1$ regarding the brightness wherein the total of said values is zero, the shape obtained from said foreground pattern being different from that terns are arranged in a predetermined geometrical or positional relationship corresponding to said object pattern, the brightness value of each pixel of said foreground pattern being different from what of each pixel of said background, a portion of each of said reference patterns being designated as a specific portion, such that pixels having a value of 0 are not positioned between pixels having a value of 1 and pixels having a value of $-1$;
   (b) storing said positional relationship;
   (c) dividing said image into a plurality of sections;
   (d) selecting arbitrarily an area having two or more of said sections, the shape of said area corresponding to that of said reference pattern;
   (e) obtaining brightness data from each of said sections;
   (f) obtaining a sum of products of the brightness value of each pixel of both said reference pattern and other reference patterns and the brightness data of each section corresponding to the pixel;
   (g) moving said area to another position in said image;
   (h) repeating steps (e) to (g);
   (i) selecting two or more portions from which the sum having an extreme value or a value adjacent to said extreme value is obtained, for both said reference pattern and other reference patterns;
   (j) obtaining the position in each of said selected portions which corresponds to said specific part or said other specific part;
   (k) obtaining the positional relationships in each pair of said obtained positions;
   (l) obtaining the pair having the positional relationship which is closest to said stored positional relationship; and
   (m) deciding that the area which corresponds to said obtained pair is the one containing said object pattern.

2. A method according to claim 1 wherein said extreme value is the largest value among said obtained sums.

3. A method according to claim 1 wherein said extreme value is the smallest value among said obtained sums.

* * * * *

UNITED STATES PATENT AND TRADEMARK OFFICE
CERTIFICATE OF CORRECTION

PATENT NO. :  5,226,095
DATED      :  July 6, 1993
INVENTOR(S):  Kazumusa Okumura et al It is certified that error appears in the above-indentified patent and that said Letters Patent is hereby corrected as shown below:

The title page should be deleted to appear as per attached.

The drawing sheets, consisting of Figs. 1A - 5B, should be deleted to be replaced with the drawing sheets, consisting of Figs. 1A - 5B, as shown on the attached pages.

Signed and Sealed this

Twelfth Day of April, 1994

Attest:

BRUCE LEHMAN

Attesting Officer

Commissioner of Patents and Trademarks

United States Patent [19]

Okumura et al.

[11] Patent Number: 5,226,095
[45] Date of Patent: Jul. 6, 1993

[54] METHOD OF DETECTING THE POSITION OF AN OBJECT PATTERN IN AN IMAGE

[75] Inventors: Kazumasa Okumura, Uji; Seiji Mizuoka, Katano, both of Japan

[73] Assignee: Matsushita Electric Industrial Co., Ltd., Osaka, Japan

[21] Appl. No.: 890,323

[22] Filed: May 26, 1992

Related U.S. Application Data

[63] Continuation of Ser. No. 431,511, Nov. 3, 1989, abandoned.

[30] Foreign Application Priority Data

Nov. 4, 1988 [JP] Japan .................. 63-278691

[51] Int. Cl.⁵ ............................... G06K 9/36
[52] U.S. Cl. ............................ 382/48; 382/27
[58] Field of Search ............... 382/48, 22, 27, 30, 382/34, 8

[56] References Cited

U.S. PATENT DOCUMENTS

| | | | |
|---|---|---|---|
| 3,898,617 | 8/1975 | Kashioka et al. | 382/48 |
| 4,334,241 | 6/1982 | Kashioka et al. | 382/48 |
| 4,543,660 | 9/1985 | Maeda | 382/34 |
| 4,581,762 | 4/1986 | Lapidus et al. | 382/22 |

OTHER PUBLICATIONS

Tzay Young "Handbook of Pattern Recognition and Image Processing" 1986, pp. 192-193, 219-220.

Primary Examiner—David K. Moore
Assistant Examiner—David Fox
Attorney, Agent, or Firm—Panitch Schwarze Jacobs & Nadel

[57] ABSTRACT

A method in which the position of an object pattern in an image can be accurately detected is disclosed. The method comprises the steps of: (a) preparing a reference pattern which has a pattern and a background which are composed of pixels each having a value regarding the brightness or gradation; (b) dividing the image into a plurality of sections; (c) selecting arbitrarily an area having two or more of the sections; (d) obtaining the brightness data from each of the sections; (e) obtaining a sum of products of the value of each pixel and the brightness data of each section corresponding to the pixel; (f) moving the area to another position in the image; (g) repeating steps (d) to (f); and (h) deciding that the area from which the sum having an extreme value is obtained is the one containing the object pattern.

3 Claims, 5 Drawing Sheets

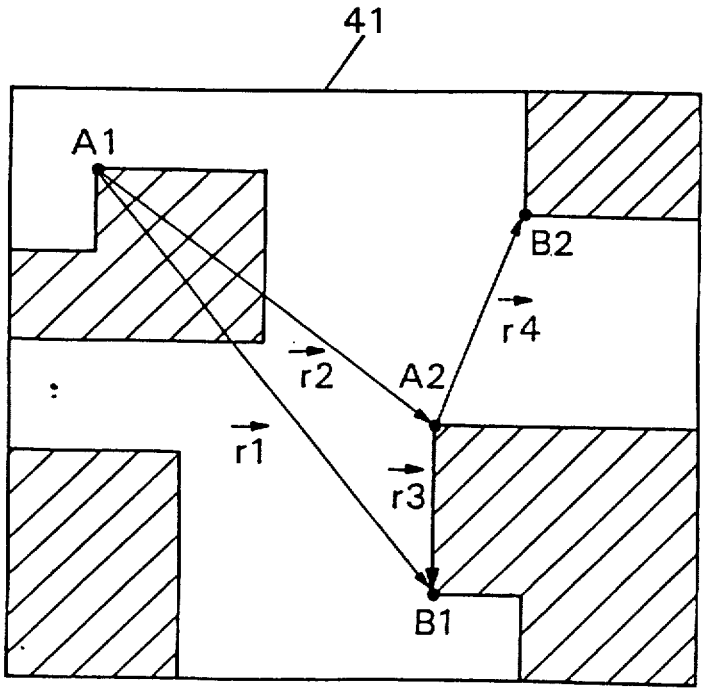

Fig. 1A
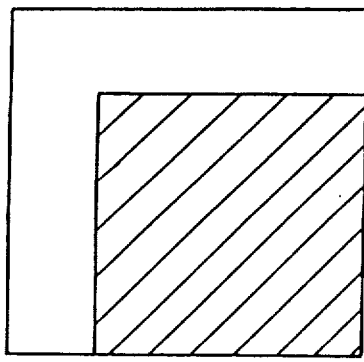
Fig. 1B
| -1 | -1 | -1 | -1 | -1 | -1 | -1 | -1 |
|---|---|---|---|---|---|---|---|
| -1 | -1 | -1 | -1 | -1 | -1 | -1 | -1 |
| -1 | -1 | 1 | 1 | 1 | 1 | 1 | 1 |
| -1 | -1 | 1 | 1 | 1 | 1 | 1 | 1 |
| -1 | -1 | 1 | 1 | 1 | 1 | 1 | 1 |
| -1 | -1 | 1 | 1 | 1 | 1 | 0 | 0 |
| -1 | -1 | 1 | 1 | 1 | 0 | 0 | 0 |
| -1 | -1 | 1 | 1 | 1 | 0 | 0 | 0 |
Fig. 1C
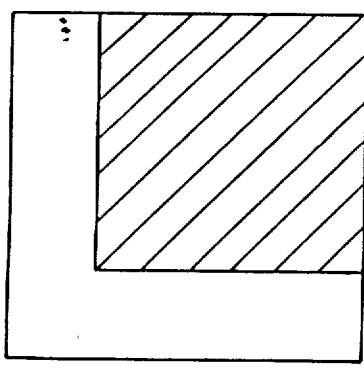
Fig. 1D
| -1 | -1 | 1 | 1 | 1 | 0 | 0 | 0 |
|---|---|---|---|---|---|---|---|
| -1 | -1 | 1 | 1 | 1 | 0 | 0 | 0 |
| -1 | -1 | 1 | 1 | 1 | 1 | 0 | 0 |
| -1 | -1 | 1 | 1 | 1 | 1 | 1 | 1 |
| -1 | -1 | 1 | 1 | 1 | 1 | 1 | 1 |
| -1 | -1 | 1 | 1 | 1 | 1 | 1 | 1 |
| -1 | -1 | -1 | -1 | -1 | -1 | -1 | -1 |
| -1 | -1 | -1 | -1 | -1 | -1 | -1 | -1 |
Fig. 1E
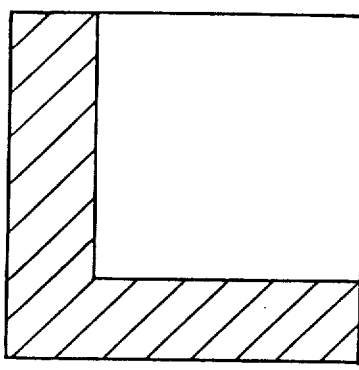
Fig. 1F
| 1 | 1 | -1 | -1 | -1 | 0 | 0 | 0 |
|---|---|---|---|---|---|---|---|
| 1 | 1 | -1 | -1 | -1 | 0 | 0 | 0 |
| 1 | 1 | -1 | -1 | -1 | -1 | 0 | 0 |
| 1 | 1 | -1 | -1 | -1 | -1 | -1 | -1 |
| 1 | 1 | -1 | -1 | -1 | -1 | -1 | -1 |
| 1 | 1 | -1 | -1 | -1 | -1 | -1 | -1 |
| 1 | 1 | 1 | 1 | 1 | 1 | 1 | 1 |
| 1 | 1 | 1 | 1 | 1 | 1 | 1 | 1 |

Fig. 2A

|   | 0 | 1 | 2 | 3 | 4 | 5 | 6 | 7 |
|---|---|---|---|---|---|---|---|---|
| 0 | -1 | -1 | -1 | -1 | -1 | -1 | -1 | -1 |
| 1 | -1 | -1 | -1 | -1 | -1 | -1 | -1 | -1 |
| 2 | -1 | -1 | 1 | 1 | 1 | 1 | 1 | 1 |
| 3 | -1 | -1 | 1 | 1 | 1 | 1 | 1 | 1 |
| 4 | -1 | -1 | 1 | 1 | 1 | 1 | 1 | 1 |
| 5 | -1 | -1 | 1 | 1 | 1 | 1 | 0 | 0 |
| 6 | -1 | -1 | 1 | 1 | 1 | 0 | 0 | 0 |
| 7 | -1 | -1 | 1 | 1 | 1 | 0 | 0 | 0 |

21

Fig. 2B

| 21 | 22 | 23 | 22 | 22 | 22 | 21 | 22 | 22 | 22 | 23 | 22 | 22 | 22 | 21 | 22 | 22 | 21 | 22 |
|----|----|----|----|----|----|----|----|----|----|----|----|----|----|----|----|----|----|----|
| 22 | 22 | 22 | 23 | 22 | 22 | 22 | 21 | 22 | 22 | 23 | 23 | 24 | 22 | 22 | 22 | 21 | 22 | 23 | 22 |
| 22 | 22 | 23 | 22 | 22 | 22 | 22 | 22 | 22 | 22 | 22 | 22 | 23 | 22 | 21 | 22 | 22 | 22 | 22 |
| 22 | 22 | 23 | 22 | 22 | 21 | 22 | 21 | 22 | 22 | 22 | 22 | 22 | 22 | 22 | 22 | 21 | 22 | 22 |
| 22 | 22 | 22 | 22 | 22 | 21 | 21 | 21 | 22 | 22 | 22 | 22 | 22 | 22 | 22 | 21 | 22 | 21 | 21 | 21 |
| 22 | 22 | 22 | 22 | 22 | 22 | 21 | 22 | 22 | 23 | 22 | 23 | 22 | 22 | 22 | 21 | 21 | 21 | 22 | 22 |
| 22 | 23 | 22 | 22 | 22 | 22 | 22 | 22 | 22 | 22 | 22 | 23 | 22 | 22 | 22 | 21 | 22 | 22 | 22 |
| 22 | 23 | 22 | 22 | 22 | 22 | 22 | 22 | 22 | 22 | 22 | 24 | 23 | 22 | 22 | 23 | 22 | 22 | 23 | 24 |
| 22 | 22 | 22 | 22 | 22 | 22 | 21 | 22 | 22 | 22 | 23 | 24 | 26 | 25 | 24 | 25 | 23 | 24 | 24 | 25 |
| 24 | 24 | 23 | 21 | 24 | 25 | 26 | 22 | 22 | 22 | 24 | 28 | 29 | 30 | 28 | 26 | 29 | 30 | 28 | 27 |
| 25 | 26 | 27 | 26 | 29 | 28 | 22 | 23 | 23 | 22 | 24 | 30 | 43 | 44 | 46 | 43 | 46 | 47 | 45 | 46 |
| 45 | 46 | 45 | 44 | 47 | 27 | 22 | 22 | 22 | 22 | 23 | 29 | 45 | 47 | 46 | 45 | 46 | 46 | 47 | 47 |
| 44 | 45 | 46 | 49 | 48 | 26 | 21 | 22 | 23 | 23 | 24 | 27 | 44 | 44 | 45 | 46 | 46 | 45 | 48 | 49 |
| 45 | 46 | 46 | 49 | 43 | 27 | 22 | 22 | 22 | 23 | 25 | 30 | 46 | 46 | 46 | 45 | 47 | 44 | 48 | 48 |
| 46 | 45 | 49 | 47 | 48 | 28 | 23 | 22 | 22 | 23 | 25 | 29 | 45 | 46 | 46 | 46 | 48 | 48 | 47 | 48 |
| 45 | 46 | 46 | 47 | 47 | 29 | 23 | 23 | 22 | 22 | 24 | 28 | 46 | 47 | 47 | 46 | 49 | 48 | 47 | 49 |
| 45 | 45 | 47 | 46 | 47 | 30 | 23 | 22 | 22 | 22 | 24 | 27 | 45 | 45 | 46 | 49 | 50 | 49 | 47 | 49 |
| 46 | 46 | 46 | 46 | 47 | 28 | 24 | 23 | 22 | 23 | 23 | 26 | 27 | 28 | 30 | 47 | 50 | 50 | 48 | 49 |
| 46 | 46 | 45 | 46 | 46 | 27 | 23 | 22 | 22 | 22 | 24 | 26 | 27 | 29 | 31 | 48 | 51 | 51 | 49 | 50 |

A, B, 22

Fig. 5A

PRIOR ART

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 1 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |

—51

Fig. 5B

PRIOR ART

| 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 | 1 | 1 | 1 |
| 1 | 1 | 1 | 1 | 1 | 0 | 0 | 0 | 0 | 0 | 0 | 0 | 0 | 0 | 1 | 1 | 1 | 1 | 1 |
| 1 | 1 | 1 | 1 | 1 | 0 | 0 | 0 | 0 | 0 | 0 | 0 | 0 | 0 | 1 | 1 | 1 | 1 | 1 |

—52

—C

UNITED STATES PATENT AND TRADEMARK OFFICE
CERTIFICATE OF CORRECTION

PATENT NO. : 5,226,095
DATED      : July 6, 1993
INVENTOR(S): Okumura et al.

It is certified that error appears in the above-identified patent and that said Letters Patent is hereby corrected as shown below: Title page:

<u>IN Item [75]</u>:

Change the address of the inventor's as follows:
    --Kazumasa Okumura, Kyoto, Japan
      Seiji Mizuoka, Osaka, Japan--.

Column 6:
    In claim 2, lines 7 and 8, delete "pattern being different from that terns" and insert --patterns when said reference patterns--.

Signed and Sealed this

Twenty-eighth Day of June, 1994

Attest:

BRUCE LEHMAN

Attesting Officer    Commissioner of Patents and Trademarks